United States Patent [19]

Chen

[11] Patent Number: 5,787,956
[45] Date of Patent: Aug. 4, 1998

[54] FOLDABLE CAR SUNSHADE CURTAIN

[76] Inventor: Ing-Wen Chen, 2F, No. 3, Lane 57, Min-Tzu Rd., Hsin-Chu city, Taiwan

[21] Appl. No.: 680,659

[22] Filed: Jul. 16, 1996

[51] Int. Cl.$^6$ .................................................. B60J 3/00
[52] U.S. Cl. ..................... 160/370.23; 160/DIG. 13; 296/97.8; 296/97.9; 24/324; 24/662; 292/19
[58] Field of Search ............... 160/DIG. 13, 370.23, 160/370.22, 368.1; 296/97.8, 97.9; 292/19, 80; 24/324, 662, 461

[56] References Cited

U.S. PATENT DOCUMENTS

| | | | |
|---|---|---|---|
| 2,200,702 | 5/1940 | Oddie | 292/19 X |
| 4,647,102 | 3/1987 | Ebrahimzadeh | 160/370.23 X |
| 4,775,180 | 10/1988 | Phillips | 160/370.23 X |
| 4,823,859 | 4/1989 | Park | 160/370.22 |
| 4,886,104 | 12/1989 | Eldridge, Jr. | 160/370.23 |
| 4,932,711 | 6/1990 | Goebel | 160/370.23 X |
| 5,314,226 | 5/1994 | Tovar | 160/370.23 X |

*Primary Examiner*—Blair Johnson
*Attorney, Agent, or Firm*—Pro-Techtor International

[57] ABSTRACT

A car sunshade curtain, attached to a car window, comprising: a pleated curtain; a first and a second support bar on both sides of the pleated curtain, the first support bar being provided with a plurality of fastening devices attachable to the car window and removable from the car window, the second support bar being provided with an eyehole and a suction cup to be attached to the car window after unfolding the pleated curtain; and a buttoning device, being provided with a button and a buckle, the button being insertable into the buckle to be held there, the button and the buckle being separately mounted on the first and the second support bar, respectively, to fasten the first and the second support bar together and thereby fold up the pleated curtain.

1 Claim, 8 Drawing Sheets

FOLDABLE CAR SUNSHADE CURTAIN

TECHNICAL FIELD

This invention relates to an easily foldable sunshade curtain for use in a car, particularly to a car sunshade curtain, which is attachable to the windows or windshield of a car.

BACKGROUND OF ART

Currently there are many sorts of sunshades in cars available. The area of the shade, however, cannot be regulated. The sunshades cannot be stored away simply and they break easily. So they are rather uncomfortable to use. Rollable textile sunshades are held together by a spring. When such a sunshade is opened, a considerable force has to be applied. Then the suction cup used to fix the sunshade may fall down, which makes usage invonvenient. Rollable textile sunshades are complicated, and their production cost is high. They often will not be rolled up uniformly and so cannot be stored, leaving their use far from ideal.

Another kind of sunshades, working by reflexion, has the problems given below:

1. Reflective sunshades use highly elastic metal sheets or wires to unfold. When folding them back, a large elastic force often causes them to unfold again, making that process awkward.

2. Since that area of the unfolded sunshade is fixed, the location of the suction cups is hard to control, so the shaded area is also hard to control.

3. The area of unfolded reflective sunshades is large, and their weight on their periphery is large as compared to their weight at the fixing points of the suction cups. So the sunshades easily sway and lie obliquely, whwn the car is in motion, which is unaesthetic and reduces the shading effect. When the car develops large vibrations, high moments result, and the suction cups get loose.

SUMMARY OF THE INVENTION

The main objective of this invention consists in providing a foldable car sunshade curtain, which effectively shades sunlight and does not easily fall down.

A further objective of this invention consists in providing a simple and handy foldable car sunshade curtain with reasonable low production cost.

A further objective of this invention consists in providing a foldable car sunshade curtain of small volume, which is easy to store and is durable.

A further objective of this invention consists in providing a foldable car sunshade curtain, which can be fixed on a window without swaying and whose suction cups will not get loose.

These objectives as well as further advantages will become apparent by the following description and claims, taken in conjunction with the accompanying drawings.

BEST MODE TO CARRY OUT THE INVENTION

This invention is a car sunshade curtain, which is light and handy, according to the user's needs installable on a car window, and easily foldable to a small volume.

Figure 1:
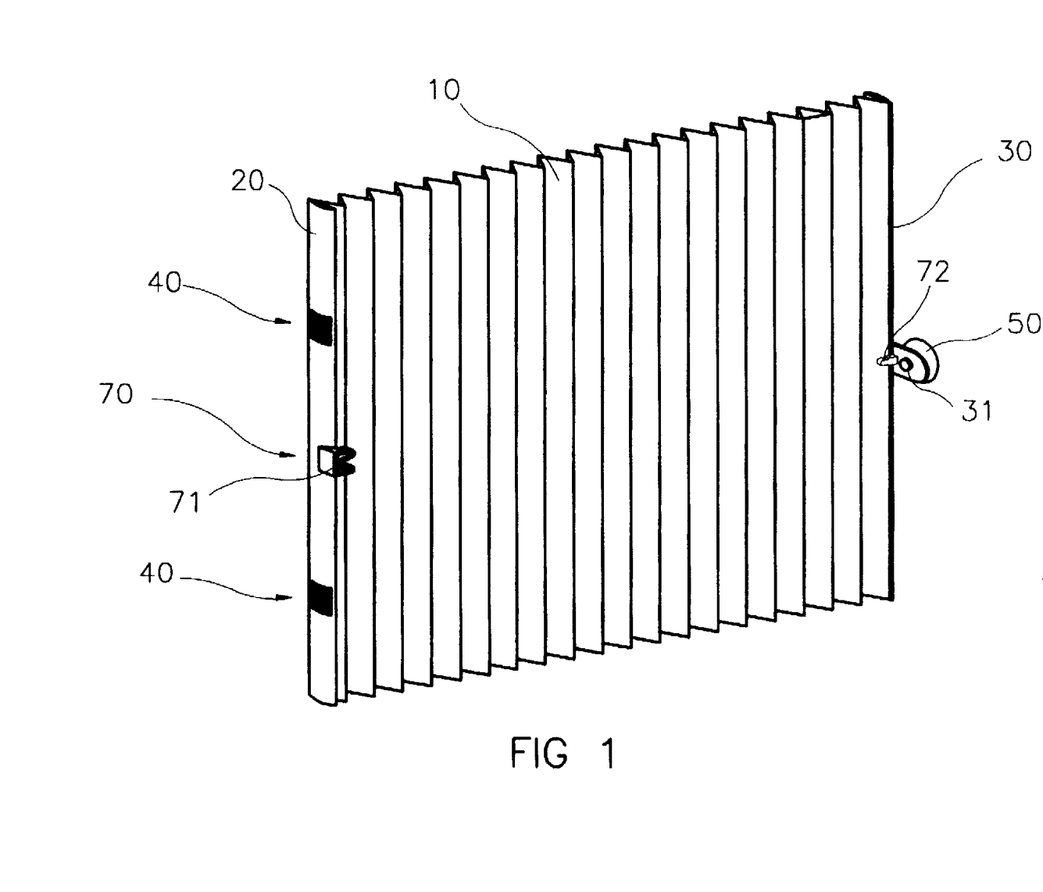
FIG. 1 is a three-dimensional view of this invention's sunshade curtain when unfolded.

As shown in FIG. 1, the car sunshade curtain of this invention in a first embodiment mainly comprises: a pleated curtain 10, made of thin stripes of sun-shading material, which is unfoldable to a large area and foldable back; a first support bar 20, attached to one side of the pleated curtain 10; and a second support bar 30, attached to the other side of the pleated curtain 10.

The first and second support bars 20 and 30 are stripes or rods of about the same length as the pleated curtain 10. They are stiff enough to stay unbent and unbroken, thus being able to support the pleated curtain 10, when it is unfolded to a large area.

The first support bar 20 is provided with a plurality of attaching devices 40. They are used to attach the first support bar 20 to a suitable location on a car window. The second cupport bar 30 is provided with an eyehole 31 and at least one suction cup 50 to allow the second support bar 30 to stick to a car window. The suction cup 50 is connected to the eyehole 31, such that the user can, holding the eyehole 31, stick the suction cup 50 on the car window or remove it from the car window.

Figure 2:
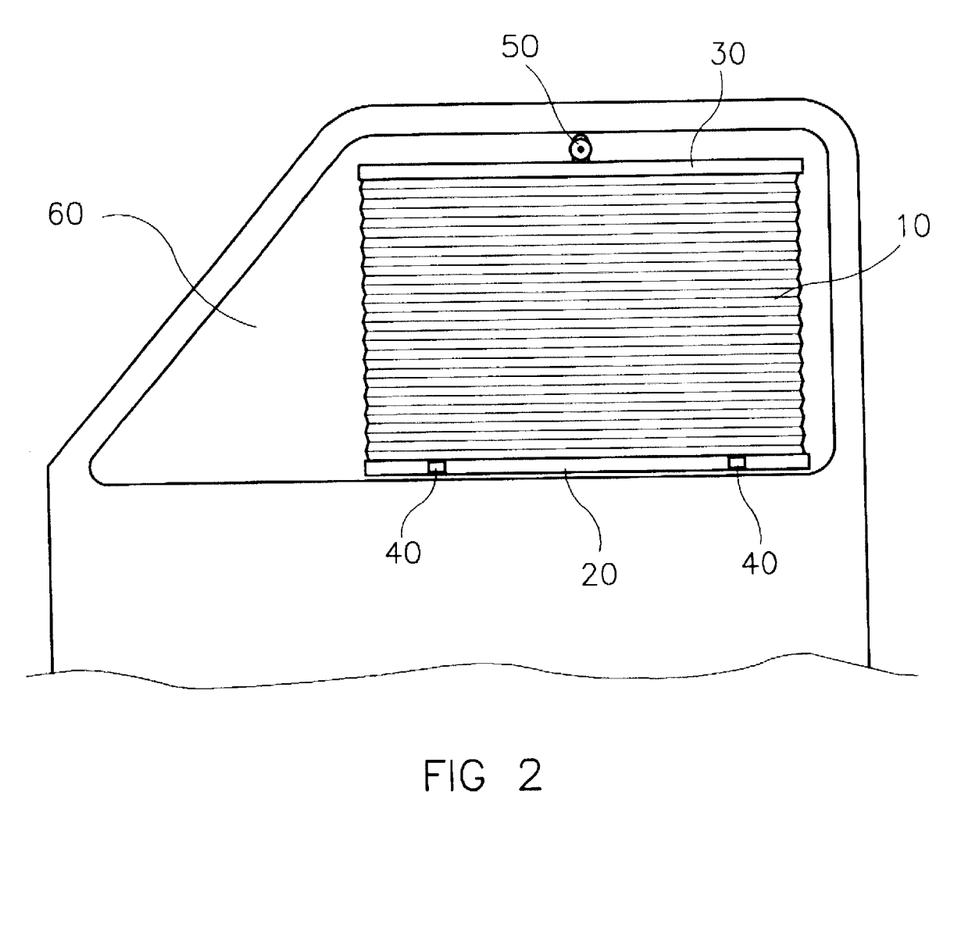
FIG. 2 is a schematic illustration of this invention's sunshade curtain installed on the side window of a car.
Figure 3:
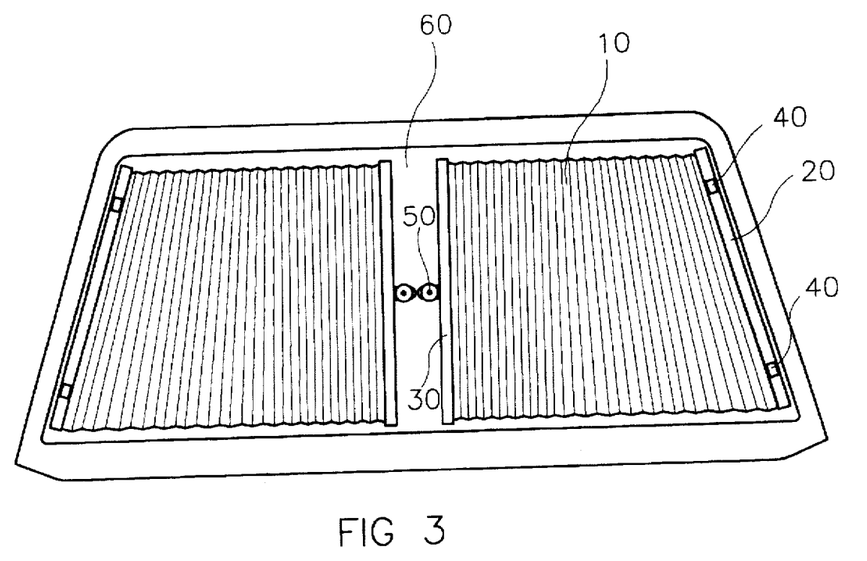
FIG. 3 is a schematic illustration of this invention's sunshade curtain installed on the windshield or back window of a car.
Figure 4:
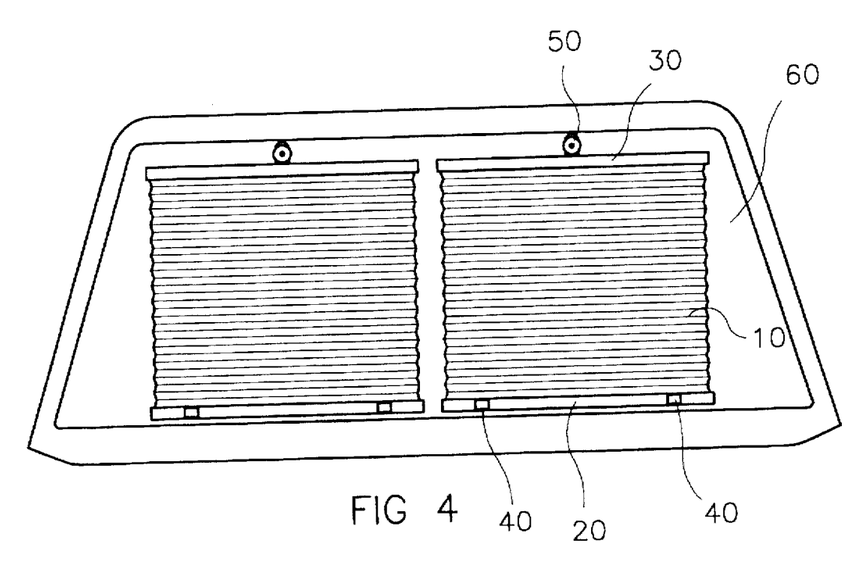
FIG. 4 is a schematic illustration of this invention's sunshade curtain installed on the windshield or back window of a car, using a second method of installation.

AS shown in FIGS. 2 and 4, when the car sunshade curtain of this invention is used, the user attaches the first support bar 20 according to the car window side and according to his needs at a suitable position on the car window. Then he draws the second support bar 30 up and attaches it by means of the suction cup 50 on the car window 60. Thus the pleated curtain 10 is unfold and stays close to the car window 60, giving the desired effect as a sunshade.

Figure 5:
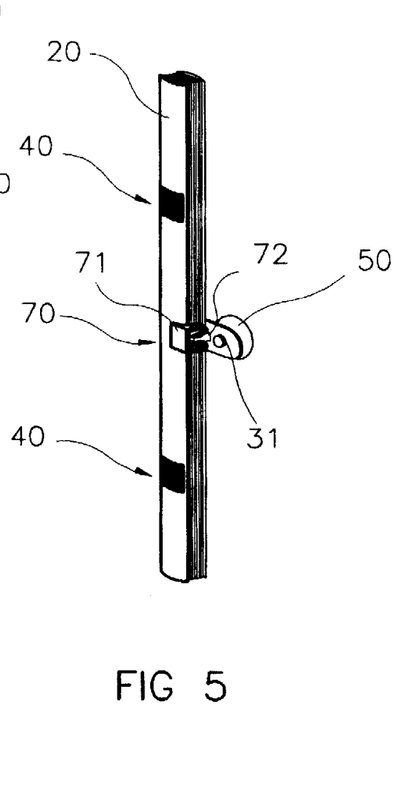
FIG. 5 is a three-dimensional view of this invention's sunshade curtain when folded.

As shown in FIG. 5, when the car sunshade curtain of this invention is not used, it is folded up to a bundle and attached on one edge of the window to allow for unrestricted view through the car window. The first and second support bar 20 and 30 are provided with a buttoning system 70. The buttonimg system 70 comprises a clasp 71 and a button 72. The clasp 71 and the button 72 are separately attached to the first and the second support bar 20 and 30, respectively. When the first and second support bar 20 and 30 are brought close to each other, they are held together by engaging the clasp 71 and the button 72.

Figure 6:
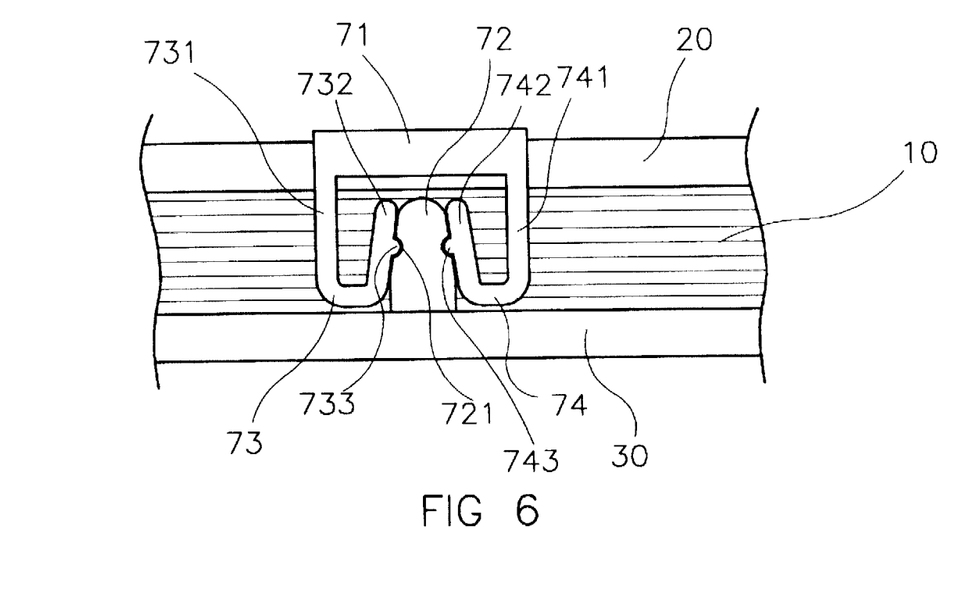
FIG. 6 is a top view showing the buttoning system of this invention.

As shown in FIG. 6, the clasp 71 is provided with two symmetrical buckle wings 73 and 74. The button 72 may enter the space between the buckle wings 73 and 74 and is then held between them by their elasticity.

The buckle wings 73 and 74 are made of plastic or another elastic material. The buckle wings 73 and 74 each consist of a fixed part 731 and 741 as well as of an elastic part 732 and 742. The fixed parts 731 and 741 are fastened to the first support bar 20 and protrude perpendicularly from the first support bar 20 towards the second support bar 30. The elastic parts 732 and 742 are extensions of the fixed parts 731 and 741, respectively, bent back towards the first support bar 20 and lying between the fixed parts 731 and 741. Their free ends are elastically bendable, thus being able to hold an object between them. When the button 72 has been inserted into the space between the elastic parts 732 and 742, both sides of it connect closely to the elastic parts 732 and 742 and are held by the elastic parts 732 and 742.

Each of the elastic parts 732 and 742 is further provided with a bulge 733 and 743, which correspond to two notches 721 next to the second support bar 30. Thereby the button 72, having been inserted into the space between the elastic parts 732 and 742, is held back in this position.

This invention's clasp 71 and button 72 are separately attached to the first and the second support bar 20 and 30, perpendicularly protruding out of them. In the first embodiment of this invention the button 72 forms a single body with the eyehole 31 on the second support bar 30. The clasp 71 is attached to the first support bar 20 in a position corresponding to the button 72.

This invention's buttoning system 70 is provided on one side of the curtain only, in order to avoid any interference with thepleated curtain 10 while unfolding it.

Figure 7:
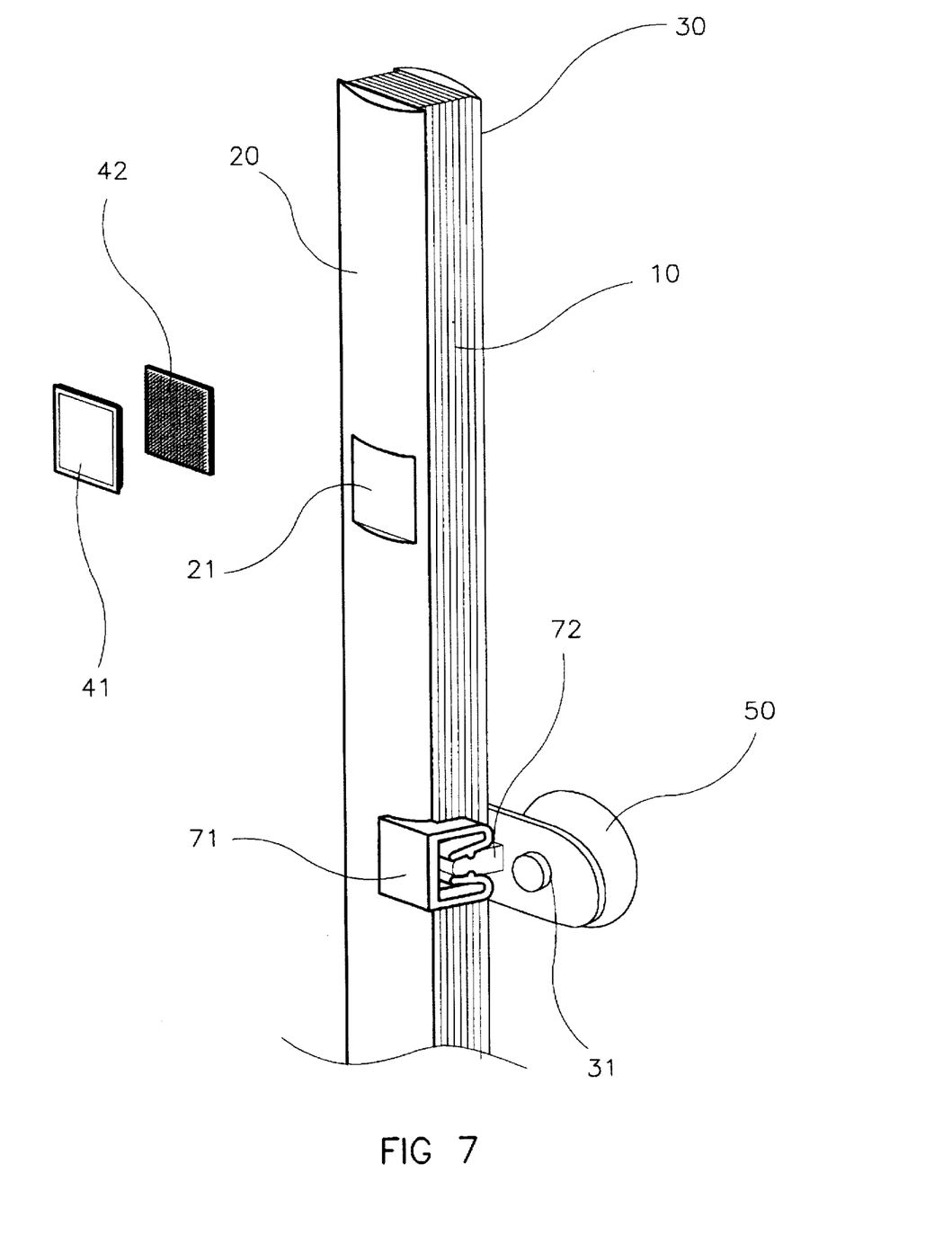
FIG. 7 is an enlarged detailed three-dimensional view showing the fastening system of this invention in a first embodiment.

The attaching device 40 of the first embodiment of this invention is an adhesive bur-like fastening. As shown in FIG. 7, the outer side of the first support bar 20 is provided with a plurality of flat areas 21, to each of which the attaching device 40 is fastened. The attaching device 40 comprises a felt plate 41 and an adhesive plate 42. The adhesive plate 42 carries a great number of densely distributed short hooks, which stick to the felt plate 41 when brought close and which can be torn off.

The back sides of each of the felt plates 41 and the adhesive plates 42 are covered with double-sided adhesive tape. So one of any pair of plates 41 and 42 is attachable to a flat area 21, and the other to one of the car windows 60 at a desired position, corresponding to the position of the flat area 21 on the first support bar 20. Thereby the user may repeatedly install this invention's car sunshade curtain on a car window and take it away.

Figure 8:
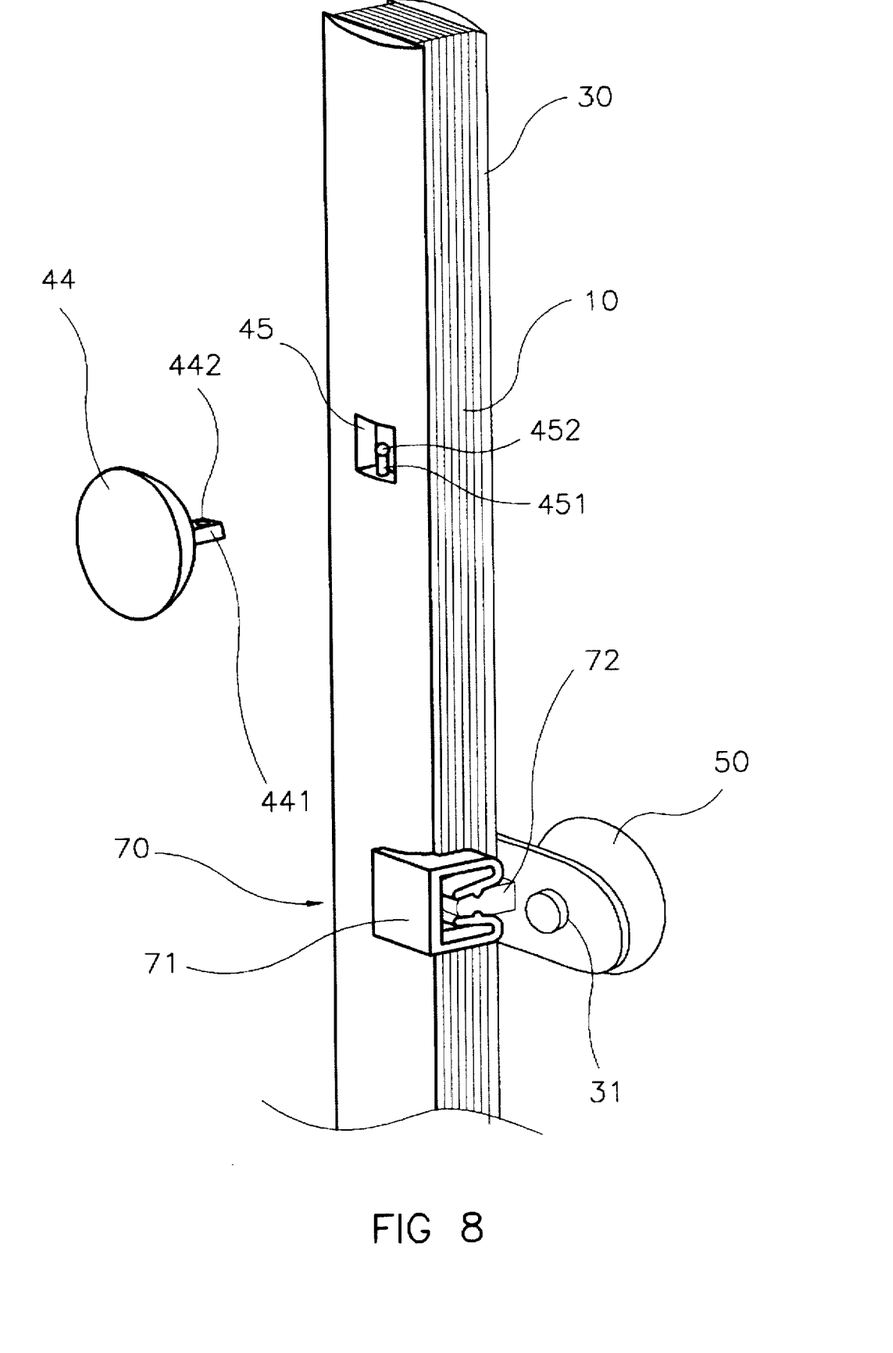
FIG. 8 is an enlarged detailed three-dimensional view showing the fastening system of this invention in a second embodiment.
Figure 9:
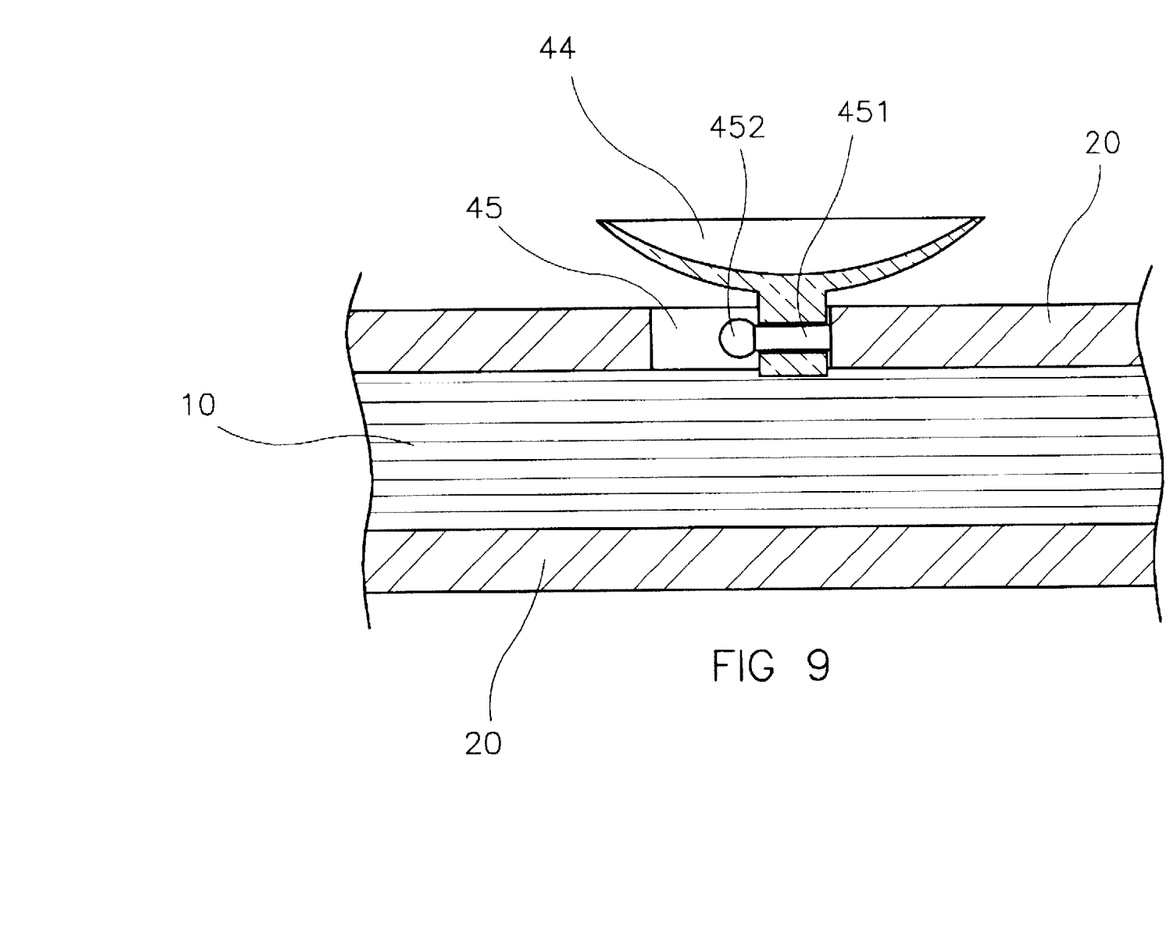
FIG. 9 is a sectional view showing how the suction cup and the insertion hole of this invention in the second embodiment are connected.

As shown in FIG. 8, this invention in a second embodiment employs a suction cup 44 instead of the attaching device 40. The first support bar 20 is then provided with an opening 45. As shown in FIG. 9, the suction cup 44 has on its back side a fastening part 441, which in turn is provided with a through hole 442, bored parallel to the surface the suction cup 44 adheres to. From the wall of the opening 45 a bolt 451 protrudes into the opening 45. The bolt 451 is stuck through the hole 442 in order to fasten the suction cup 44 to the first support bar 20. The bolt 451 has a blocking part 452 on its top. The opening 45 is wide enough to accommodate the bolt 451 with the blocking part 452 and still allow the fastening part 441 to be inserted above them.

When this invention's car sunshade curtain in the second embodiment is used, the user inserts the fastening part 441 into the opening 45, the hole 442 being aligned with the bolt 451, then presses the fastening part 441 onto the bolt 451. The diameter of the hole 442 is slightly smaller than the diameter of the blocking part 452. So after the hole 442 has been put over the bolt 451, it is blocked in its position.

Figure 10:
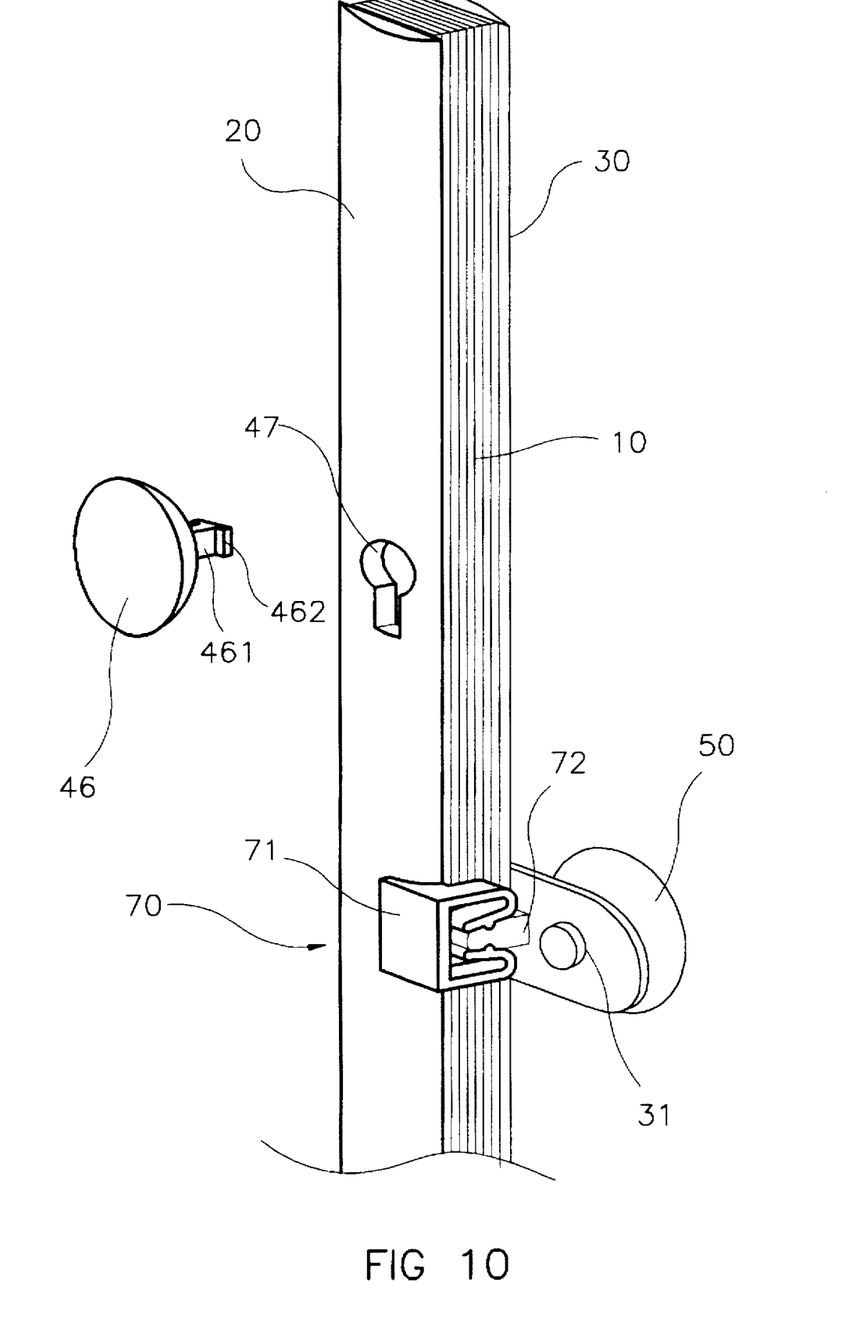
FIG. 10 is an enlarged detailed three-dimensional view showing the fastening system of this invention in a third embodiment.

As shown in FIG. 10, this invention in a third embodiment employs a suction cup 46 instead of the suction cup 44. The difference between suction cups 46 and 44 is that suction cup 46 has a fastening part 461 on its back side that is roughly shaped like a T, the horizontal bar 462 of the T pointing away from the suction cup. The first support bar 20 is then provided with a plurality of openings 47. Each opening 47 is roughly shaped like a keyhole turned upside down, i.e., the width of its lower part is larger than the width of the bar 462, while the width of its upper part is smaller than the width of the bar 462. Thereby the fastening part 461 can be inserted into the hole 47 and is held back there.

The suction cups 44 and 46 employed in the second and third embodiment of this invention may repeatedly be put together with and taken away from the first support bar 20. When the user has put the suction cups 44 or 46 into the insertion holes 45 or 47, he can with the suction cups 44 or 46 attach this invention's car sunshade curtain on the car window 60.

This invention may employ attaching devices 40 and suction cups 44 and 46 at the same time, according to the user's needs, thus extending the applicability of this invention.

The system of this invention's car sunshade curtain is light and handy. This invention can be folded up to a small volume or easily taken away when not needed, making its use very convenient. Furthermore, its pleated curtain 10 is flexible for expansion and contraction, therefore it is adjustable to various window sizes and forms. Using more than one car sunshade curtain leads to an enhanced sunshade effect.

The system of this invention's car sunshade curtain is convenient. The pleated curtain, when unfolded, does not pull heavily on the second support bar 30. So the suction cup 50 of the second support bar 30 will not easily fall down.

What is claimed is:

1. A sunshade curtain for a car window comprising:

a pleated curtain made of strips of sun-shading material, said curtain is unfolded to maximize a shading area, and said curtain is folded to minimize a storage area, a first support bar on a first side of said pleated curtain, said first support bar includes a plurality of fastening devices adapted to removably attach said first support bar to the car window, each said fastening device comprises a suction cup, each said suction cup is provided with a rearward protruding fastening part on a rear portion thereof, said fastening part includes a through hole therein, said first support bar further includes a plurality of openings to receive said fastening parts, said openings comprise a bolt with a blocking part on a free end thereof, a diameter of said blocking part is larger than a diameter of said throug hole of said fastening part such that when said through hole of said fastening part passes over said blocking part of said bolt, each said suction cup is secured in a corresponding one of said openings, a second support bar on a second side of said curtain, said second support bar includes an eyehole and at least one suction cup, engaging a buttoning device including a button and a buckle, said button is inserted into said buckle and is secured therein, said button and said buckle are separately mounted on said first and said second support bars respectively; wherein said first support bar is adapted to be attached to an edge of the car window by means of said fastening devices, and said second bar is attached to an opposite edge of the window by means of said suction cup, such that said curtain is unfolded, and wherein said first support bar is fastened to said second support bar by means of said buttoning device when said curtain is folded for storage.

* * * * *